United States Patent [19]

Doyle

[11] Patent Number: 5,602,664

[45] Date of Patent: Feb. 11, 1997

[54] INFRARED REPEATER

[75] Inventor: Albert L. Doyle, Plainfield, Ind.

[73] Assignee: Thomson Consumer Electronics, Inc., Indianapolis, Ind.

[21] Appl. No.: 467,121

[22] Filed: Jun. 6, 1995

[51] Int. Cl.$^6$ ................................................ H04B 10/00
[52] U.S. Cl. ........................... 359/142; 359/146; 359/176; 340/825.71
[58] Field of Search ........................ 359/142, 143, 359/144, 145, 146, 147, 148, 174, 175, 176, 177; 340/825.71, 825.24; 455/352, 20, 11.1

[56] References Cited

U.S. PATENT DOCUMENTS

| | | | |
|---|---|---|---|
| 4,809,257 | 2/1989 | Gantenbein et al. | 359/172 |
| 5,301,355 | 4/1994 | Koihuma et al. | 455/21 |
| 5,349,463 | 9/1994 | Hirohashi et al. | 455/20 |

FOREIGN PATENT DOCUMENTS

| | | | |
|---|---|---|---|
| 0015798 | 1/1990 | Japan | 359/176 |
| 2219164 | 11/1989 | United Kingdom | 359/176 |

OTHER PUBLICATIONS

Data Sheet for TEMIC TFMS 5..0 –series Photo Modules.

*Primary Examiner*—Wellington Chin
*Assistant Examiner*—Rafael Bacares
*Attorney, Agent, or Firm*—Joseph S. Tripoli; Peter M. Emanuel; Thomas F. Lenihan

[57] ABSTRACT

An IR repeater is disclosed which is resistant to CFL interference. The IR repeater includes a receiver section for receiving an IR light signal representing a coded signal modulated by a modulating signal, and for detecting the coded signal. An oscillator generates a transmitter modulating signal, and a transmitter section, coupled to the receiver section and the oscillator, generates an IR light signal representing the detected coded signal modulated by the transmitter modulating signal.

19 Claims, 2 Drawing Sheets

INFRARED REPEATER

FIELD OF THE INVENTION

The present invention relates to an infrared repeater, and more specifically an infrared repeater which remains operative in the presence of interference caused by compact fluorescent lights.

BACKGROUND OF THE INVENTION

Current wireless remote control units for consumer electronic equipment, such as television receivers, video cassette recorders, and cable or satellite receiver boxes, operate by transmitting an infrared (IR) light signal, representing a coded signal modulated on a modulating signal, from the remote control unit to the consumer electronic equipment. This modulated IR light signal is received by an IR receiver in the consumer electronic equipment, demodulated, decoded, and the appropriate action taken. IR remote control units are line-of-sight devices, meaning that any consumer electronic equipment which is in a shadow with respect to the IR light generated by the remote control unit will not be able to receive the IR light signal and respond to the command. In addition, IR remote control units have a limited operational range, which is sufficient for use within a room, but not sufficient for use between rooms.

Currently, however, consumer electronic equipment is being placed inside of pieces of furniture, such as home entertainment units, behind solid doors. For example, a television, cable box, satellite receiver, etc., may be placed in a home entertainment unit in such a manner that, though the television receiver is visible to the viewer, the cable box, satellite receiver and VCR are placed behind solid doors. In addition, consumer electronic equipment is being distributed among different rooms in a home. For example, a satellite receiver might be located next to one television receiver in a family room, but may also coupled to a second television receiver in a bedroom. The IR light generated by remote control units cannot penetrate through solid doors or pass from room to room, so the hidden or remotely located equipment may not be controlled.

To provide the capability of controlling consumer electronic equipment within cabinets or in different rooms of a home, IR repeaters have been developed. An IR repeater includes an IR receiver section located where it can receive the coded modulated IR signal generated by the remote control unit. For example, it may be located on the outside of an entertainment unit or in the room in which the remote control unit is being used. The IR receiver section is connected to an IR transmitter section located where the consumer electronic equipment which is to be controlled can receive its signal. For example, it is located inside of the entertainment unit or in the room in which the consumer electronic equipment is located. The IR transmitter section includes an IR light emitter which is placed so that the emitted IR light impinges on the IR receiver in the consumer electronic equipment to be controlled. More specifically, the IR light emitter is usually placed directly adjacent to the IR receiver in the consumer electronic equipment. The IR receiver section of the IR repeater detects the coded IR light signals produced by the remote control unit and transmits them to the IR transmitter section, usually via a wire. The IR transmitter section generates an IR light signal which is identical to the IR light signal received by the IR receiver section. The consumer electronic equipment receives this IR light signal from the IR transmitter section, and performs the desired function.

Different manufacturers of consumer electronic equipment use different modulating frequencies for modulating the coded control signal onto the IR light signal. In order for IR repeaters to work with the respective manufacturers' modulation frequencies, IR repeaters use an IR detector in the IR receiver section which has a relatively wideband frequency response characteristic. That is, it will detect modulated IR light signals for which the modulating frequency can vary over a relatively wide range of frequencies. For example, IR repeaters can generally detect IR light signals which are modulated at any modulating frequency from about 20 kilohertz (kHz) to 100 kHz. Any modulated IR signal in this frequency range may be detected by the IR receiver, and when detected, an IR signal mimicking the received signal is generated at the IR transmitter.

Recently fluorescent lights having electronic ballast, termed compact fluorescent lights (CFLs), have been developed as a replacement for incandescent lights. CFLs use less energy than incandescent lights, and have become popular for that reason. However, CFLs produce IR light which has characteristics similar to those of the coded modulated IR light signals produced by remote control units. That is, the electronic ballast in a CFL causes the fluorescent tube to produce IR light signals which appear to be modulated by a modulating frequency in the range of 20 to 100 kHz, and specifically by a frequency of about 56 kHz. In addition, the IR light produced by CFLs has an intensity far greater than that produced by remote control units. Thus, the IR light produced by a CFL completely overpowers the coded modulated IR light signal produced by a remote control unit. Because current IR repeaters mimic the IR signal received by its receiving section, any interference from nearby CFLs picked up by the IR repeater is also mimicked in the IR light signal produced by the IR repeater. It has been found that, in the presence of CFLs, IR repeaters have seriously degraded performance or even become completely inoperative.

IR detectors have been developed which are resistant to interference caused by CFLs. These detectors can receive an IR light signal representing a coded modulated control signal from a remote control unit in the presence of interfering IR light from a CFL and, and in a known manner, cancel the interference from the CFL. The coded modulated IR light signal from the remote control unit is then demodulated, and such an IR detector produces an electrical signal representing the coded control signal.

An IR repeater which can operate with remote control units from many manufacturers, and which can operate reliably in the presence of CFLs is desirable.

SUMMARY OF THE INVENTION

In accordance with principles of the present invention, an IR repeater, resistant to CFL interference, includes a receiver section for receiving an IR light signal representing a coded signal modulated by a modulating signal, and for detecting the coded signal. An oscillator generates a transmitter modulating signal, and a transmitter section generates an IR light signal representing the detected coded signal modulated by the transmitter modulating signal.

If a CFL resistant IR detector is used in the receiver section, the effect of CFLs can be minimized, and the operation of the receiver portion will not be seriously degraded by CFLs. The receiver section is tuned to respond to a modulating signal center frequency about in the middle of the range of frequencies used by the respective manufacturers, and the frequency of the modulating signal produced by the oscillator is also about in the middle of that range of frequencies. Because the frequency of the modulating signal in the IR signal produced by the transmitter section of the IR repeater is about in the middle of the range of frequencies used by the respective manufacturers, it may be detected by the IR receivers in the consumer electronic equipment of any such manufacturer. In addition, the transmitter modulating signal is a clean signal produced by an oscillator in the repeater, not mimicked from the receiver section. Thus, the signal produced by an IR repeater according to the present invention will produce a clean modulated IR light signal, free of CFL interference.

DETAILED DESCRIPTION OF THE DRAWING

Figure 1:
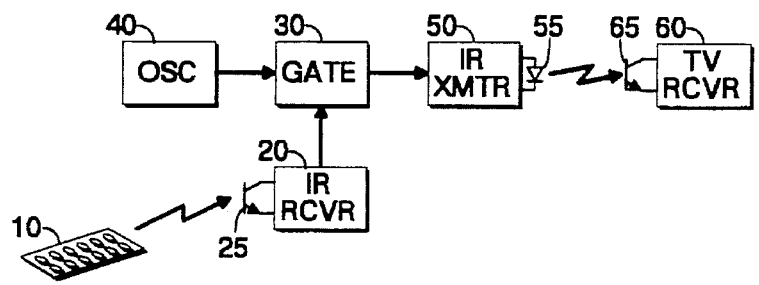
FIG. 1 is a block diagram illustrating a remote control system including an IR repeater according to the present invention.

In FIG. 1, a remote control unit 10 provides coded control signals modulated on an IR light signal to an IR light detector 25 of an IR receiver section 20 of an IR repeater. In the IR repeater of FIG. 1, the IR light detector 25 is illustrated as an IR phototransistor, although any IR light detecting device may be used. A control output terminal of the IR receiver section 20 is coupled to a control input terminal of a signal gate 30. A fixed frequency oscillator 40 has a signal output terminal coupled to a signal input terminal of the signal gate 30. A signal output terminal of the signal gate 30 is coupled to an input terminal of an IR transmitter section 50 of the IR repeater. The IR transmitter section 50 is coupled to an IR light emitter 55 which produces an IR light signal corresponding to the electrical signal received at the input terminal of the IR transmitter section 50. In the IR repeater of FIG. 1, the IR light emitter is illustrated as an IR light emitting diode (LED), although any IR light emitting device may be used. This IR light emitter 55 is placed so that the IR light emitted impinges upon an IR light detector 65 of a piece of consumer electronic equipment 60. In FIG. 1, the IR light detector 65 is illustrated is an IR phototransistor, although any IR light detecting device may be used. In addition, the consumer electronic equipment 60 is illustrated as a television receiver, although the IR repeater of FIG. 1 will work with any consumer electronic equipment which can be remotely controlled by an IR remote control unit.

In operation, the remote control unit 10 produces a coded modulated IR light signal. In the illustrated embodiment, the coded signal (described in more detail below) is a pulse code modulated (PCM) signal representing a command for the television receiver 60. This signal is detected by the IR phototransistor 25, which generates an electrical signal representing the coded modulated signal, and supplies that signal to the IR receiver section 20. The IR receiver section 20 demodulates the electrical signal from the IR light sensor 25, and produces a bistate signal representing the pulses making up the PCM signal. This signal has a first state representing the presence of modulated IR light at the IR phototransistor 25, e.g. a logic '1' signal; and a second state representing the absence of modulated IR light at the IR phototransistor 25, e.g. logic '0' signal. This signal is supplied to the control input terminal of the signal gate 30.

The fixed frequency oscillator 40 produces a modulating signal having a frequency of around 47 kHz at its output terminal. This frequency is selected to be close to the middle of the range of frequencies (from around 32 kHz to around 56 kHz) used by respective manufacturers to modulate their PCM signals on the IR light signal from their remote control units. This modulating signal is supplied to the data input terminal of the signal gate 30. The signal gate 30 operates as a controllable switch. When the signal from the IR receiver section 20 is a logic '1' signal (representing the presence of modulated IR light at the IR phototransistor 25), the signal gate 30 is conditioned to pass the modulating signal at its signal input terminal to its output terminal. When the signal from the IR receiver section 20 is a logic '0' signal (representing the absence of modulated IR light at the IR phototransistor 25), the signal gate 30 is conditioned to block the modulating signal at its input terminal. The output signal from signal gate 30 is an electrical signal representing the received coded signal modulated on a 47 kHz modulating signal.

The signal from the signal gate 30 is supplied to the IR transmitting section 50. The IR transmitting section 50 conditions this signal to drive the IR LED 55 so that it produces an IR light signal corresponding to this modulated signal. The IR light signal produced by the IR LED 55, thus, is the pulse coded signal received by the IR phototransistor 25, but modulated on a 47 kHz modulating signal. This coded modulated IR light signal impinges on the IR phototransistor 65 in the television receiver 65. The television receiver 60 responds in the normal manner to the received modulated coded IR light signal by executing the command represented by that coded signal.

Figure 2:
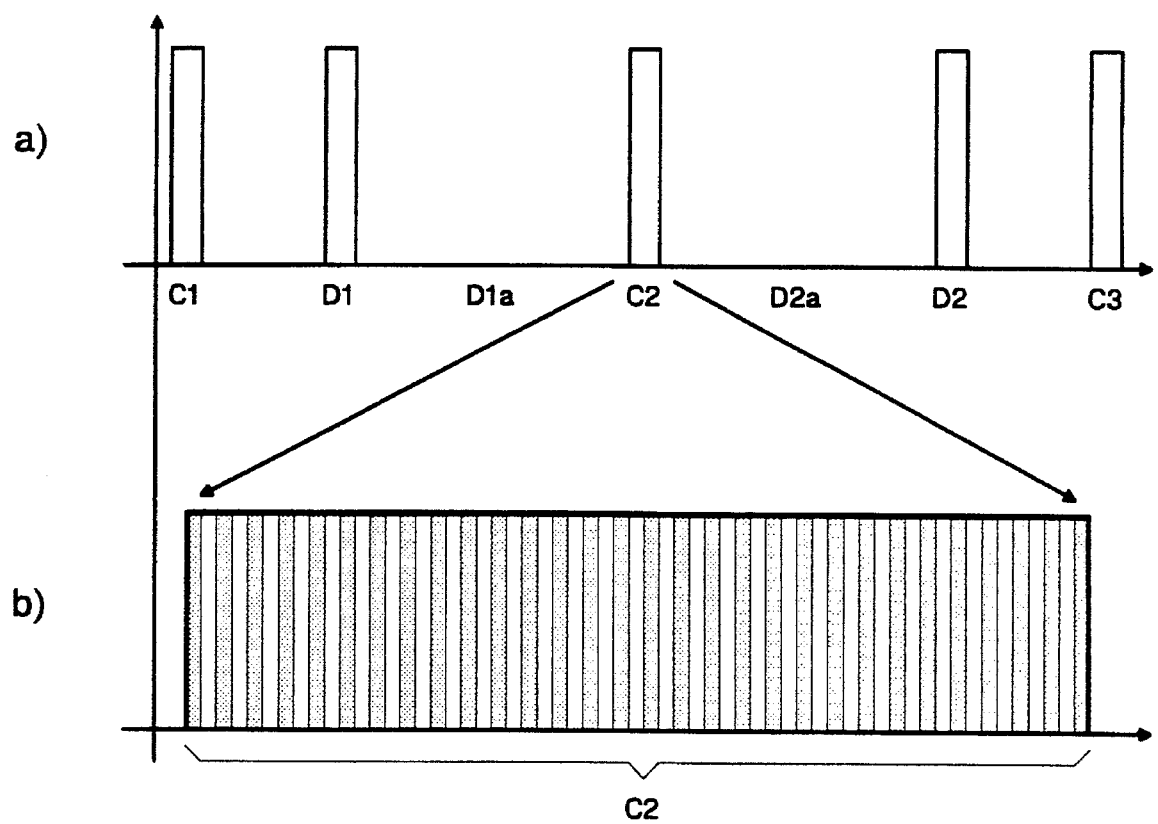
FIG. 2 is a waveform diagram useful in understanding the operation of the present invention.

FIG. 2 is a waveform diagram useful in understanding the operation of the present invention. The waveforms illustrated in FIG. 2 represent the coded modulated signals as produced both by the remote control unit 10 (of FIG. 1) and the IR LED 55 of the IR repeater. The differences between the signals produced by these respective sources will be described below. In FIG. 2, a series of code pulses axe illustrated. In FIG. 2a, the pulses axe arranged to form a pulse position coded signal. A series of clock pulses C1, C2, C3, . . . are produced with data pulses D1, D2, . . . interspersed between them. The time position of the data pulses D1, D2 . . . between the clock pulses C1, C2, C3, . . . determines whether a logical '1' or '0' is being transmitted during the interval between successive clock pulses C1, C2, C3, . . . .

Referring to clock pulses C1 and C2 and data pulse D1, the data pulse D1 is closer in time to clock pulse C1 than to clock pulse C2. This represents a data bit having a logic '1' value. Referring now to clock pulses C2 and C3 and data pulse D2, the data pulse D2 is closer in time to clock pulse C3 than to clock pulse C2. This represents a data bit having a logic '0' value. Had the first data pulse been transmitted at the alternative time D1a, it would have represented a data bit having a logic '0' value, and had the second data pulse been transmitted at the alternative time D2a, it would have represented a data bit having a logic '1' value. A control signal comprises a predetermined number of data bits.

FIG. 2b illustrates in more detail the composition of clock pulse C2 illustrated in FIG. 2a. Each pulse illustrated in FIG.

2a has a predetermined pulse width, and is composed of cycles of IR light pulses occurring at the modulating frequency. In FIG. 2b, shaded areas represent the presence of IR light, and blank areas represent a lack of IR light. The envelope of the IR light pulses, repeating at the modulating frequency, defines the clock and data pulses illustrated in FIG. 2a. For the modulated coded pulses produced by the remote control unit 10 (of FIG. 1), the modulating frequency is that used by the manufacturer of the remote control unit 10 (running from about 32 kHz to about 56 kHz.) For the modulated coded pulses produced by the IR LED 55 of the transmitting section 50 of the IR repeater, the modulating frequency is selected to be about 47 kHz.

Referring again to FIG. 1, as described above, the IR light receiver section 20 is designed to detect and minimize the effects of spurious IR light emitted by CFLs. The IR light emitted by CFLs consists of successive groups of IR light pulses having a frequency between about 20 and 100 kHz. The light pulses have envelopes defined by the AC power supplied to the CFL. Within each half cycle of the AC power the CFL produces a group of IR light pulses. The envelopes of the groups have a duty cycle of around 50% and the groups occur at a frequency of about twice the AC power frequency. Specifically, it has been found that one type of CFL produces IR light pulses at around 56 kHz, with envelopes having a repetition frequency in the United States of 120 Hz and a duty cycle of 40%. The characteristics of these pulses are sufficiently different from those of the pulses illustrated in FIG. 2b that the IR receiver section 20 is able to detect IR light pulses having these characteristics and cancel or minimize their effect.

As described above, the coded modulated IR light signal produced by the IR LED 55 of the IR transmitter section 50 may have a modulating frequency slightly different than that expected by the television receiver 60. However in an IR repeater application, this in not a problem. A remote control unit 10 operates from battery power and, thus, produces IR light at a relatively low power level. In addition, a remote control unit is generally operated at a relatively large distance from the television receiver, e.g. on the order of several feet away. The IR light receiver in the television receiver is sensitive enough to detect the IR light signals produced under these circumstances. But IR repeaters are generally coupled directly to the home AC power source and, thus, can produce IR light at a relatively high power level. Also, as described above, the IR LED 55 of the IR transmitter section 50 of the IR repeater is generally physically placed in close proximity to the IR phototransistor 65 of the television receiver. The relatively high power level of the IR light signal produced by the IR LED 55, and close proximity of the IR LED 55 and the IR phototransistor 65, more than overcomes the slight mistuning between the 47 kHz modulating frequency produced by the IR repeater and the modulating signal frequency expected by the television receiver 60.

As described above, the transmitter section of prior art IR repeaters produces an IR light signal which mimics that received by the receiver section. Thus, if the received IR light signal is corrupted with IR light from a CFL, the transmitted IR light signal will be similarly corrupted. The performance of such IR repeaters is greatly diminished in the presence of CFLs, and some are rendered completely inoperative. An IR repeater as illustrated in FIG. 1, however, uses a receiver section which is resistant to CFL interference. The output signal from such a receiver section (representing the demodulated coded signal) is used to modulate a clean oscillator signal from an oscillator within the IR repeater. This clean, newly generated, modulated signal controls the IR light emitter in the transmitter section. The IR light generated by the IR emitter in response to such a signal does not include any CFL interference, and its operation is not degraded in the presence of CFLs.

Figure 3:
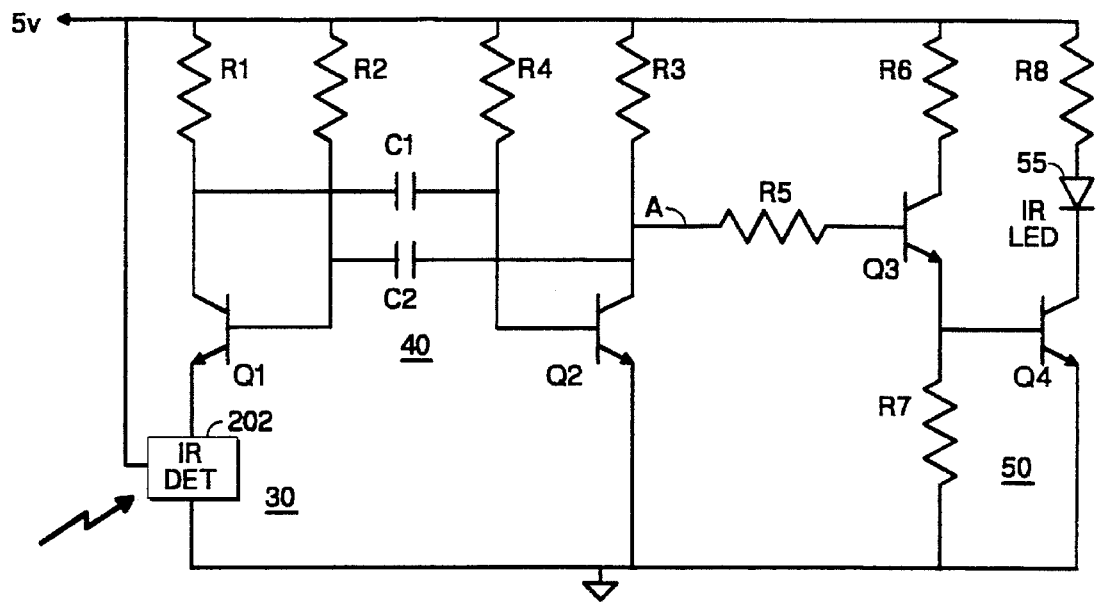
FIG. 3 is a schematic diagram illustrating in more detail the IR repeater illustrated in FIG. 1.

FIG. 3 is a schematic diagram illustrating in more detail the IR repeater illustrated in FIG. 1. In FIG. 3, a source of operating power (not shown) produces a 5 volt power signal. A resistor R1 is coupled between the source of operating power and a collector electrode of an NPN transistor Q1. The signal electrodes of an IR detector 202 are coupled between an emitter electrode of the transistor Q1 and a source of a reference potential (ground). The IR detector 202 also receives operating power by being coupled to the source of operating power. The IR detector 202 is tuned to a modulating signal center frequency of 45 kHz and is a model GP1U78QG IR detector manufactured by Sharp Electronics Corporation. A resistor R2 is coupled between the source of operating power and a base electrode of the transistor Q1. A resistor R3 is coupled between the source of operating power and a collector electrode of an NPN transistor Q2. An emitter electrode of the transistor Q2 is coupled to ground. A resistor R4 is coupled between the source of operating power and a base electrode of the transistor Q2. A capacitor C1 is coupled between the base electrode of the transistor Q2 and the collector electrode of the transistor Q1, and a capacitor C2 is coupled between the base electrode of the transistor Q1 and the collector electrode of the transistor Q2.

A resistor R6 is coupled between the source of operating power and a collector electrode of an NPN transistor Q3. A resistor R7 is coupled between an emitter electrode of the transistor Q3 and ground. A resistor R5 is coupled between the collector electrode of the transistor Q2 and a base electrode of the transistor Q3. The serial connection of a resistor R8 and an IR LED 55 is coupled between the source of operating power and a collector electrode of an NPN transistor Q4. An emitter electrode of the transistor Q4 is coupled to ground. The emitter electrode of the transistor Q3 is coupled to a base electrode of the transistor Q4. The IR LED 55 may be connected to the resistor R8 and the transistor Q4 via a long length of wire, e.g. meant to run from one room to another. The transistors Q1, Q2, Q3 and Q4 are all model MPS-A20 NPN transistors manufactured by Motorola Corporation. Table I contains preferred component values for the circuit illustrated in FIG. 3.

In operation, the IR detector 202 detects the presence of IR light modulated at the predetermined modulating signal center frequency (e.g. 45 kHz) while minimizing the effect of spurious IR light from CFLs, as described above. When modulated IR light is detected, the IR detector 202 is conditioned to conduct current between its two signal electrodes, and when no modulated IR light is detected, the IR detector 202 is conditioned to become nonconductive.

TABLE I

| Component Values | |
| --- | --- |
| R1,R3 | 1 kΩ |
| R2,R4 | 100 kΩ |
| R5 | 10 kΩ |
| R6 | 1 kΩ |
| R7 | 10 kΩ |
| R8 | 100 Ω |
| C1,C2 | 180 pf |
| IR DET | GP1U78QG |
| Q1,Q2,Q3,Q4 | MPS-A20 |

When the IR detector 202 is nonconductive (indicating no modulated IR light is being detected), transistor Q1 is turned off, and both capacitors act as open circuits. The base electrode of the transistor Q2 is pulled high through resistor R4, and the transistor Q2 is turned on, pulling the voltage at its collector electrode to ground potential. The base electrode of transistor Q3 is pulled down through resistor R5, turning transistor Q3 off. The base electrode of transistor Q4 is pulled down through resistor R7 turning transistor Q4 off, and preventing current from flowing through the IR LED 55. In short, when no modulated IR light is detected by IR detector 202, no IR light is emitted by IR LED 55.

When the IR detector 202 is conductive (indicating that modulated IR light is being detected), the emitter electrode of the transistor Q1 is coupled to ground. The combination of the transistors Q1 and Q2, the resistors R1, R2, R3 and R4, the capacitors C1 and C2 and the IR detector 202 operates in a known manner as a multivibrator oscillator (40 in FIG. 1) adjusted to oscillate and generate a square wave at about 47 kHz. The signal at the collector electrode of the transistor Q2, thus, is a 47 kHz square wave signal produced during periods when modulated IR light is detected by the IR detector 202. The IR detector 202 operates as a switch turning the multivibrator on and off. The combination of the transistors Q3 and Q4, the resistors R5, R6, R7 and R8, and the IR LED 55 forms the transmitting section (50) and operates in a known manner as a two stage emitter-follower amplifier, responsive to the oscillator 40 output, to drive the IR LED 55 on and off at a frequency of 47 kHz during periods when modulated IR light is detected by the IR detector 202. Thus, the IR LED 55 generates a coded IR light signal modulated at a frequency of 47 kHz. The IR detector 202 acts as the signal gate 30, controlling the transmission of the modulating signal from the oscillator 40 to the transmitting section 50.

Figure 4:
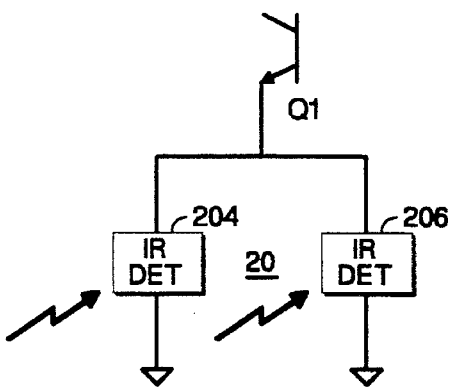
FIG. 4 is a schematic diagram illustrating an alternative embodiment for an IR detector illustrated in FIG. 3.

FIG. 4 is a schematic diagram illustrating an alternative embodiment for an IR detector 202 illustrated in FIG. 3. The IR detector 202 in the IR repeater illustrated in FIG. 3 is a single IR detector fabricated and tuned to have a modulating signal center frequency response of about 45 kHz.

In FIG. 4 the emitter electrode of the transistor Q1 is coupled to ground through the parallel connection of a first IR detector 204 and a second IR detector 206. The first IR detector 204 is tuned to a modulating signal center frequency of 38 kHz, and is a model TFMS1380 IR detector manufactured by TEMEC Telefunken Microelectronic GmbH. The second IR detector 206 is tuned to a modulating signal center frequency of 56 kHz, and is a model TFMS1560 IR detector, also manufactured by TEMEC.

An IR repeater as described above provides reliable operation in the presence of CFLs and operates with a variety of manufacturers' equipment.

What is claimed is:

1. An IR repeater comprising:
   a receiver section, for receiving an IR light signal representing a coded signal modulated by a modulating signal;
   a first IR detector coupled to said receiver section for detecting said IR light signal and generating a signal representing said coded signal;
   a fixed-frequency oscillator, for generating a transmitter modulating signal, said fixed-frequency oscillator generating said transmitter modulating signal at a predetermined frequency independent of the frequency of the received modulating signal; and
   a transmitter section, for generating an output IR light signal representing said detected coded signal modulated by said transmitter modulating signal.

2. The IR repeater of claim 1 in which said received modulating signal has a frequency within a range of frequencies, wherein said first IR detector is tuned to a center frequency substantially in the middle of said range of frequencies.

3. The IR repeater of claim 1 in which said received modulating signal has a frequency between about 32 kHz and about 56 kHz, wherein said first IR detector is tuned to a center frequency of about 45 kHz.

4. The IR repeater of claim 1 wherein said IR detector is resistant to interference generated by compact fluorescent lights.

5. The IR repeater of claim 1 further including a second IR detector, each of said first and second detectors detecting the IR light signal and generating a signal representing said coded signal.

6. The IR repeater of claim 5 in which said received modulating signal has a frequency within a range of frequencies having a lower end frequency and an upper end frequency, wherein:
   said first IR detector is tuned to a center frequency substantially near said lower end frequency; and
   said second IR detector is tuned to a center frequency substantially near said upper end frequency.

7. The IR repeater of claim 5 in which said received modulating signal has a frequency between about 32 kHz and about 56 kHz, wherein:
   said first IR detector is tuned to a center frequency of about 38 kHz; and
   said second IR detector is tuned to a center frequency of about 56 kHz.

8. The IR repeater of claim 5 wherein each one of said first and second IR detectors is resistant to interference generated by compact fluorescent lights.

9. The IR repeater of claim 1 wherein said receiver section is resistant to interference generated by compact fluorescent lights.

10. The IR repeater of claim 1 in which said received modulating signal has a frequency within a range of frequencies, wherein said predetermined frequency of the oscillator is substantially in the middle of said range of frequencies.

11. The IR repeater of claim 10 in which said range of frequencies runs from about 32 kHz to about 56 kHz, wherein said predetermined frequency of the oscillator is substantially 47 kHz.

12. The IR repeater of claim 1 in which said coded signal is a pulse coded signal having one of a first and a second state, wherein said oscillator selectively generates the transmitter modulating signal when said coded signal has said first state, and does not generate said transmitter modulating signal otherwise.

13. The IR repeater of claim 12 wherein said receiver section functions as a switch for said oscillator.

14. The IR repeater of claim 1 wherein said oscillator generates a square wave signal.

15. The IR repeater of claim 1 wherein said oscillator is a multivibrator.

16. The IR repeater of claim 1 in which the coded signal is a pulse coded signal having one of a first and a second state, wherein said repeater further comprises a signal gate, coupled between said oscillator and said transmitter section and responsive to said detected coded signal, for passing said transmitter modulating signal from said oscillator to said transmitter section when said detected coded signal has said first state, and blocking said transmitter modulating signal when said detected coded signal has the second state.

17. The IR repeater of claim 1 wherein said transmitter section comprises:
an amplifier coupled to said oscillator; and
an IR light emitter coupled to said amplifier.

18. An IR repeater comprising:
a receiver section, for receiving an IR light signal representing a coded signal modulated by a modulating signal;
a first IR detector coupled to said receiver section for detecting said IR light signal and generating a signal representing said coded signal;
an oscillator, for generating a transmitter modulating signal; and
a transmitter section, for generating an output IR light signal representing said detected coded signal modulated by said transmitter modulating signal;
further including a second IR detector, each of said first and second detectors detecting the IR light signal and generating a signal representing said coded signal;
said received modulating signal has a frequency within a range of frequencies having a lower end frequency and an upper end frequency;
said first IR detector is tuned to a center frequency substantially near said lower end frequency; and
said second IR detector is tuned to a center frequency substantially near said upper end frequency.

19. The IR repeater of claim 18 in which said received modulating signal has a frequency between about 32 kHz and about 56 kHz, wherein:
said first IR detector is tuned to a center frequency of about 38 kHz; and
said second IR detector is tuned to a center frequency of about 56 kHz.

* * * * *